United States Patent [19]

Cronin et al.

[11] Patent Number: 5,526,067
[45] Date of Patent: Jun. 11, 1996

[54] ACTUATION MECHANISM FOR VARIABLE FOCAL LENGTH EYEGLASSES

[75] Inventors: David V. Cronin, Peabody; Donald Williamson, Tyngsboro, both of Mass.

[73] Assignee: Polaroid Corporation, Cambridge, Mass.

[21] Appl. No.: 361,091

[22] Filed: Dec. 21, 1994

[51] Int. Cl.$^6$ .................................................. G02C 13/00
[52] U.S. Cl. ............................................. 351/41; 351/158
[58] Field of Search ............................ 351/158, 41, 44, 351/45, 46, 49; 359/665, 666

[56] References Cited

U.S. PATENT DOCUMENTS

| | | | |
|---|---|---|---|
| 1,269,422 | 6/1918 | Gordon . | |
| 2,576,581 | 11/1951 | Edwards | 88/41 |
| 3,598,479 | 8/1971 | Wright | 351/159 |
| 4,181,408 | 1/1980 | Senders | 351/159 |
| 4,261,655 | 4/1981 | Honigsbaum | 351/41 |
| 4,444,471 | 4/1984 | Ford, Jr. et al. | 359/666 |
| 4,834,512 | 5/1989 | Austin | 350/419 |
| 4,871,237 | 10/1989 | Anzai et al. | 350/419 |
| 4,890,903 | 1/1990 | Treisman et al. | 350/419 |
| 4,892,396 | 1/1990 | Kushibiki et al. | 350/423 |
| 4,913,536 | 4/1990 | Barnea | 350/419 |
| 4,989,958 | 2/1991 | Hamada et al. | 350/419 |
| 5,124,734 | 6/1992 | Barnea | 351/169 |
| 5,138,494 | 8/1992 | Kurtin | 359/666 |
| 5,229,885 | 7/1993 | Quaglia | 359/665 |
| 5,371,629 | 12/1994 | Kurtin et al. | 351/44 |

Primary Examiner—William L. Sikes
Assistant Examiner—James A. Dudek
Attorney, Agent, or Firm—Robert A. Sabourin

[57] ABSTRACT

Variable power eyeglasses of many shapes can be manufactured having a frame, a pair of lens assemblies and a linear actuation mechanism. Each lens assembly includes: a rigid substrate; a membrane support spaced from the rigid substrate; a flexible seal extending between the rigid substrate and the membrane support, where the flexible seal acts as a hinge at a first section and acts as a spring by allowing relative motion between the rigid substrate and the membrane support at a second section; a transparent elastomeric membrane sealed around a periphery to the membrane support; and a transparent liquid filling the space between the rigid substrate and the membrane forming a liquid lens. The linear actuation mechanism causes relative motion between the membrane and the rigid substrate so that both optical and prismatic power of the liquid lens changes by varying a force applied to the flexible sealing means at the second section. The linear actuation mechanism is positioned within a plane of the lens assemblies and includes: a pair of sliders connected via a wire passing through a tube mounted onto the frame; a pair of cams with one of the cams attached to each end of the pair of sliders; and a pair of cam followers responsive to the cams causing relative motion in response to movement of the sliders.

4 Claims, 7 Drawing Sheets

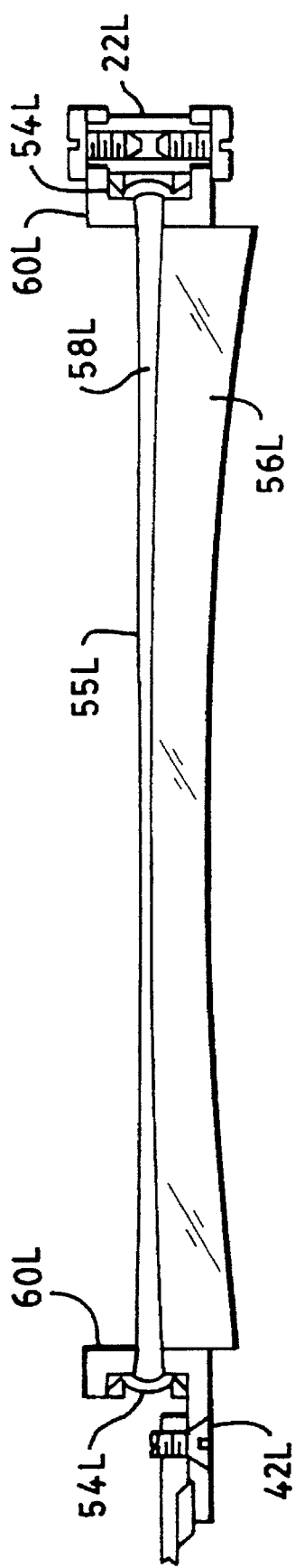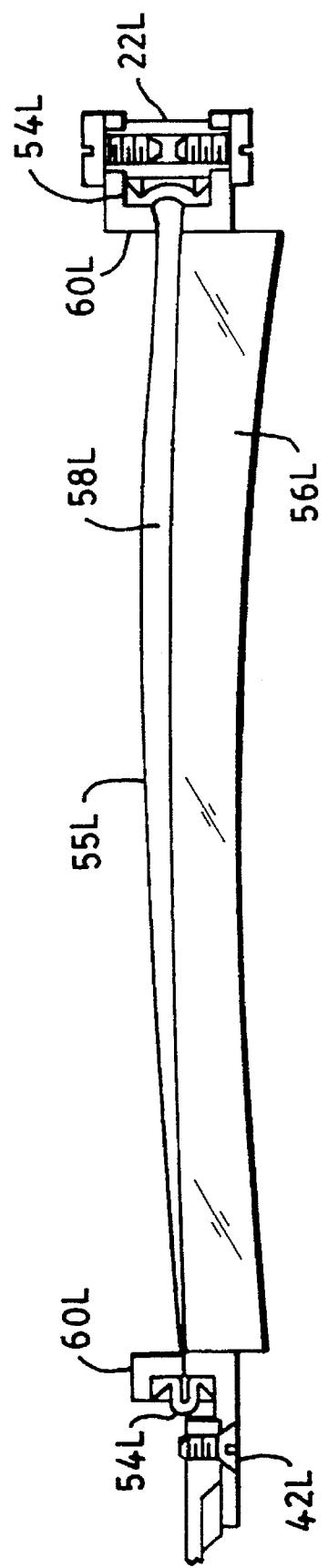

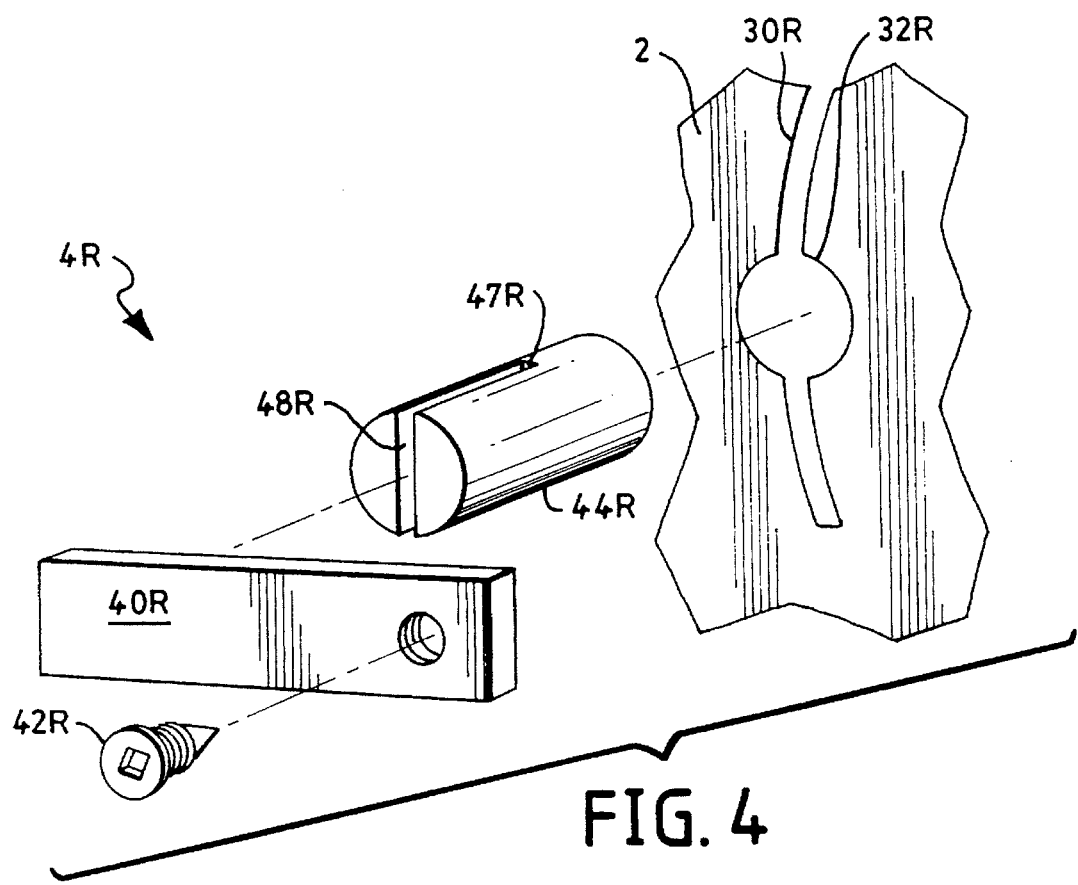
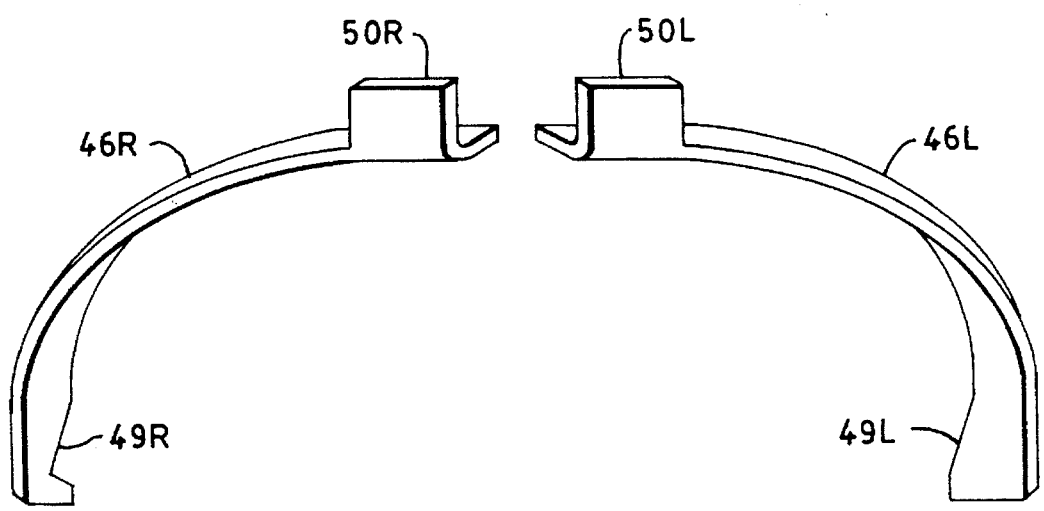
FIG. 4
FIG. 5A  FIG. 5B

ACTUATION MECHANISM FOR VARIABLE FOCAL LENGTH EYEGLASSES

FIELD OF THE INVENTION

This invention relates generally to eyeglasses having variable power lenses and, more particularly, to a novel actuation mechanism that is adjustable for use in adjusting the focus of a broad range of lenses of different stylistic shapes.

BACKGROUND OF THE INVENTION

Variable power lenses are useful in spectacles to aid in focusing and achieving changes in scale. As a result of aging, the lens in the human eye becomes incapable of sufficient accommodation for nearby objects. After the onset of the condition of limited focal accommodation, called presbyopia, single power spectacles, while of some benefit, are found to be unsatisfactory for both distant and near vision, irrespective of the wearer's general visual acuity. Whatever correction may be required to correct a person's vision for distance, an additional amount of optical power (up to about three diopters) may be required to correct that person's eyesight for near vision. The required "near addition" generally does not involve correction for astigmatism.

The usual solution for presbyopia is spectacles having multiple focal lengths. In the most common form of multifocal lenses, bifocals, the upper part of the lens is ground to provide the wearer with the proper correction, if necessary, for distance vision, and the lower part of the lens is ground with the same correction plus a relatively small addition. The near addition generally does not exceed a few diopters of optical power. Using bifocal lenses in spectacles allows a person to see distant objects clearly by looking straight ahead and close objects by looking downward.

The bifocal solution is not entirely satisfactory for at least three reasons. First, many people have difficulty in adapting to bifocals; second, there is often the need to see near objects which are on a level with, or above, the wearer, i.e. direct line of sight; and finally, there is usually a mid-distance range within which neither part of the lens is satisfactory. Trifocals or progressive multifocal lenses may also be used for a clear vision over a broader range of distances, but the first two difficulties remain. And, in addition, the in-focus field of view may be more limited than is desired. The foregoing problems were addressed in U.S. Pat. No. 5,138,494 issued on 11 Aug. 1992 to Stephen Kurtin. This patent discloses a variable focus lens which can be adjusted by the wearer to focus on any object, irrespective of its distance from the wearer. The Kurtin patent discloses two embodiments. In the first embodiment, a transparent liquid is situated between two rigid lenses connected by a flexible seal arranged along the perimeter of the lenses. An elastomeric membrane is positioned in front of and adjacent to the rigid front lens which in turn contains a plurality of holes that provide a path for the liquid to flow from one side of the rigid front lens to the other. When the liquid is forced through the holes in the rigid front lens to the area between the rigid front lens and the elastomeric membrane, the elastomeric membrane distends, causing a variation in the focus of the lens system. The second embodiment contains the transparent liquid situated between a single rigid rear lens and an elastomeric lens attached along its periphery to a rigid rim. In both embodiments, the focus of the lens system is altered when an actuation mechanism is used to apply or release a force to or from a point along the periphery of the lenses, causing the elastomeric lens to distend or retract. A prismatic effect may occur by holding the space between the membrane support and the rigid rear lens fixed at spaced pivots or hinges while applying the actuating force at a single point.

Various devices for actuating a variable power lens have been described in the prior art. One such device disclosed in "VARIABLE FOCUS SPECTACLES" by B. M. Wright, Transactions of the Opthalmological Society of the United Kingdom (1978) pp. 98, 84, describes an actuation mechanism with lenses which are connected by a fine nylon tubing, concealed in a frame, to a metal bellows housed in a side-arm and operated by a sliding button on the outside of the side-arm. Another such apparatus disclosed by Wright includes an actuation mechanism having a piston and cylinder.

Apparently, the above and other devices for actuating a variable power lens have been tried with little commercial success. Moreover, it would seem that they tend to be inaccurate, expensive to manufacture, and prone to malfunction in addition to generally poor performance. The above shortcomings are overcome by the novel actuation mechanism of the invention.

Since design and appearance of eyeglasses is another primary concern for users, eyeglasses of various shapes and styles are desirable using the variable focus lenses described by Kurtin. However it has been found that, depending upon the extent of non-circularity of the lenses, the distended membrane shape may deviate significantly from the desired spherical shape, so that greater than desired optical distortions may be encountered.

In view of the above, it is an object of the present invention to provide an improved actuation mechanism for adjusting the focus of a pair of variable power eyeglass lenses of a broad range of shapes.

It is further an object to provide various shaped eyeglasses with a circular shaped, liquid filled, variable focus lens.

It is yet another object of the present invention to provide a simple actuation mechanism that may be operated from either side of spectacles.

Other objects of the invention will in part be obvious and in part appear hereinafter when the following detailed description is read in connection with the drawings.

SUMMARY OF THE INVENTION

Spectacles with variable power lenses of various shapes can be manufactured having a frame, a pair of lens assemblies and a linear actuation mechanism. Each lens assembly includes: a transparent substrate; a membrane support spaced from the substrate; a flexible seal extending between the substrate and the membrane support, a transparent elastomeric membrane sealed around its periphery to the membrane support; and a transparent liquid filling the space between the substrate and the membrane forming a liquid lens. Preferably, the flexible seal is hinged at a first section and acts as a spring at a second section by allowing relative motion between the substrate and the membrane support. The linear actuation mechanism causes relative motion between the membrane and the substrate so that both optical and prismatic power of the lens assembly changes by varying a force applied to the flexible seal at the second section. The linear actuation mechanism is positioned generally within a plane containing the lens assemblies and includes: a pair of sliders connected via a wire passing through a tube mounted onto the frame; a pair of cams with one of the cams attached to each end of the pair of sliders; a pair of cam followers responsive to the cams for causing the relative motion between the membrane and the substrate generally perpendicular to the lens assemblies in response to movement of the sliders.

BRIEF DESCRIPTION OF THE DRAWINGS

The aforementioned aspects and other features of the invention are described in detail in conjunction with the accompanying drawings (not to scale) in which the same reference numerals are used to denote some elements throughout and wherein:

FIG. 3A is a diagrammatic cross-sectional bottom view, of a portion of a variable focus left lens assembly according to the invention;

FIG. 3B is a diagrammatic cross-sectional bottom view, of the portion of the variable focus left lens assembly of FIG. 3A, showing the effect of operation of the left lens actuator on the elastomeric membrane;

FIG. 4 is a diagrammatic fragmented perspective view of the right lens actuator of the linear actuation mechanism of FIG. 1;

FIG. 5A is a diagrammatic perspective view of a right ribbon for insertion into a corresponding right ribbon slot of FIG. 1;

FIG. 5B is a diagrammatic perspective view of a left ribbon for insertion into its corresponding left ribbon slot of FIG. 1;

DETAILED DESCRIPTION OF THE PREFERRED EMBODIMENTS

Figure 1:
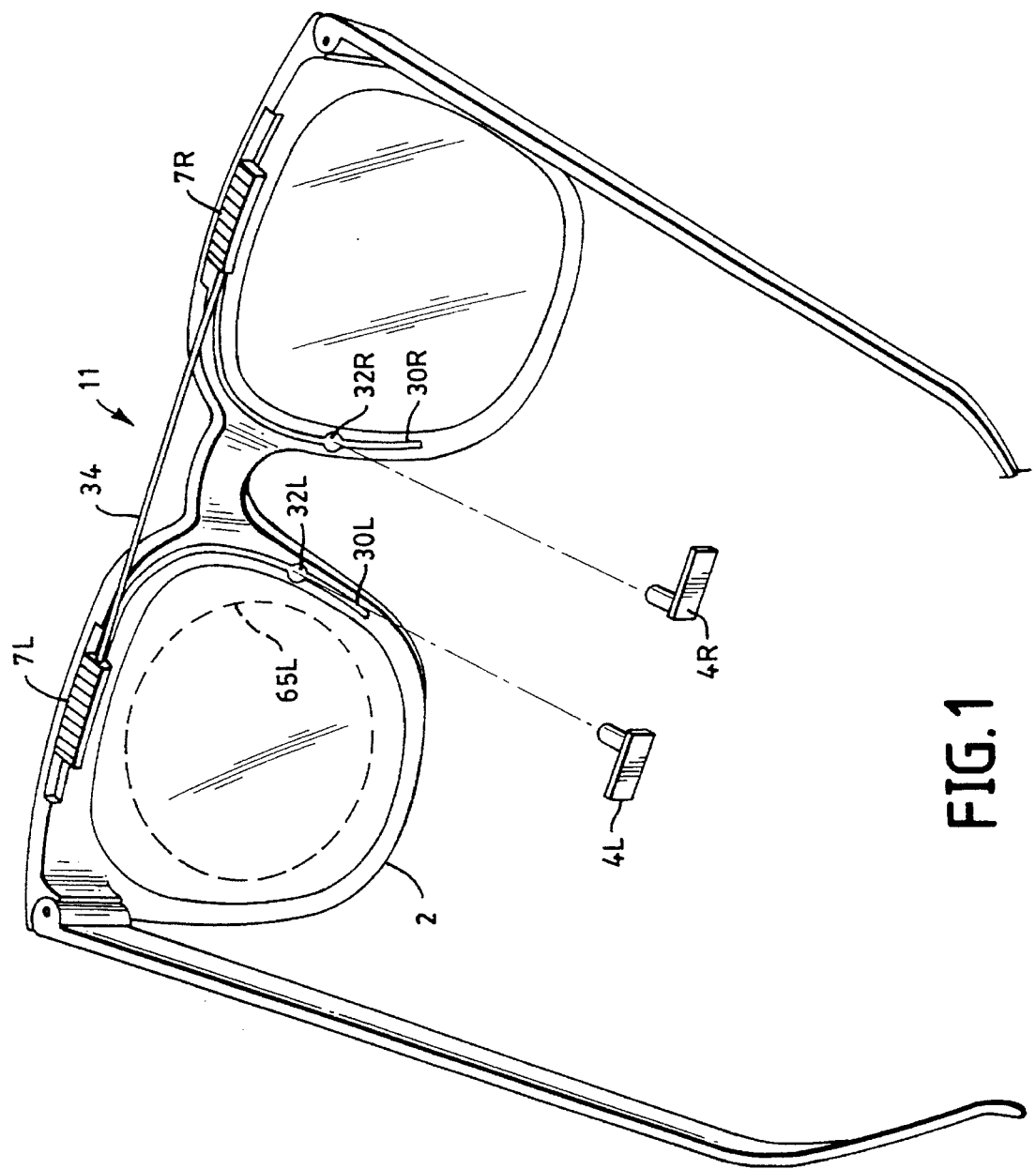
FIG. 1 is a diagrammatic rear perspective view of a pair of variable focus eyeglasses showing the various parts of one preferred embodiment of a linear actuation mechanism according to the invention.

The present invention in general relates to spectacles (as shown in FIG. 1) that are continuously variable in focal length for use by presbyopes to provide accommodation over a range of object distances. More particularly, it provides for a simplified adjustment mechanism, i.e. a linear actuation mechanism, in such spectacles to change the relative position of various elements of constituent lens assemblies that are continuously alterable in optical power. In addition, means are provided for permitting the shape, and hence aesthetic appearance of the spectacles, to be other than circular while optically variable portions can be maintained circular to provide spherically changing powers.

Figure 2:
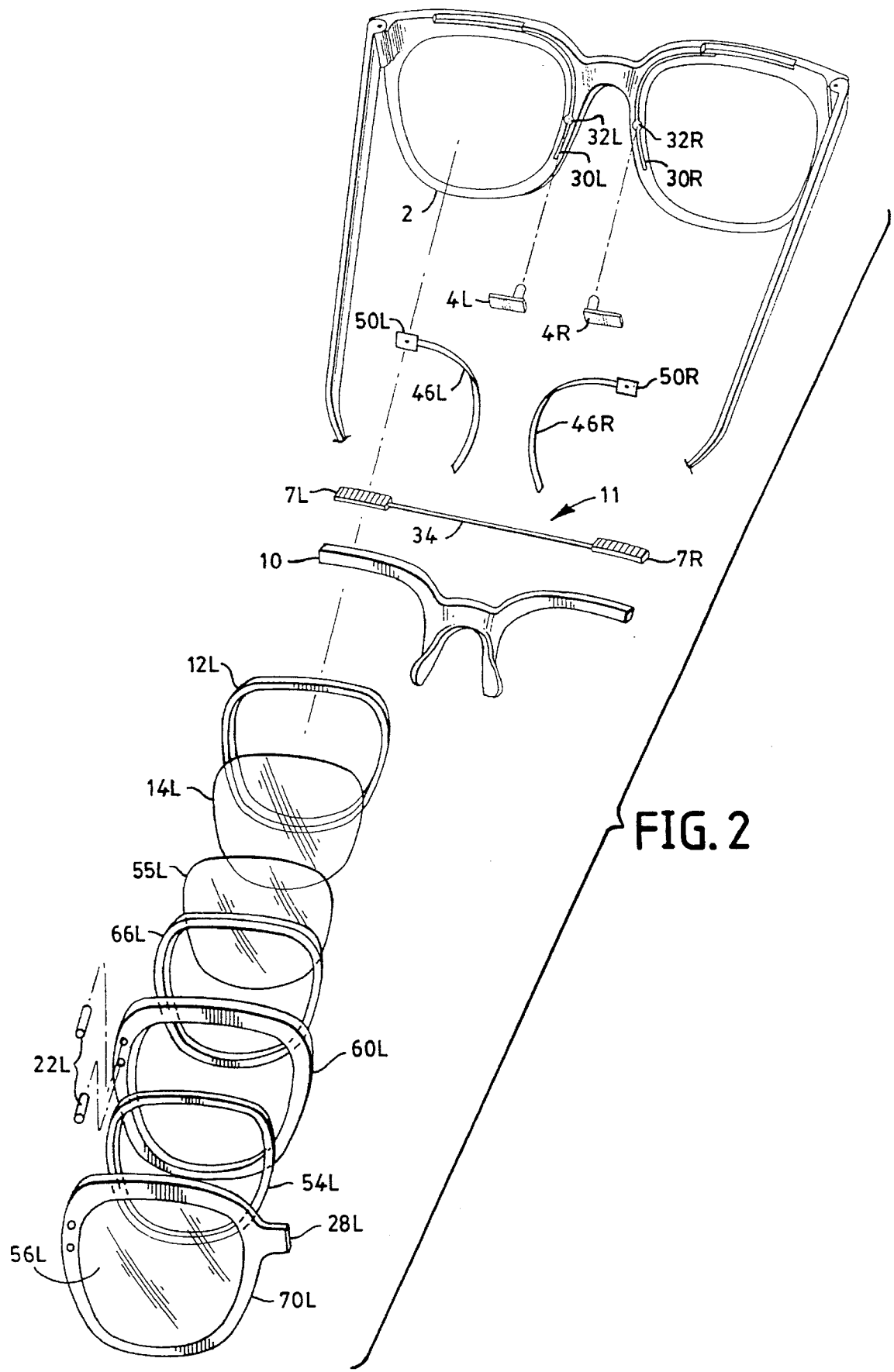
FIG. 2 is a diagrammatic exploded rear perspective view of a pair of variable focus eyeglasses along with an exploded view of its left lens assembly.
Figure 6:
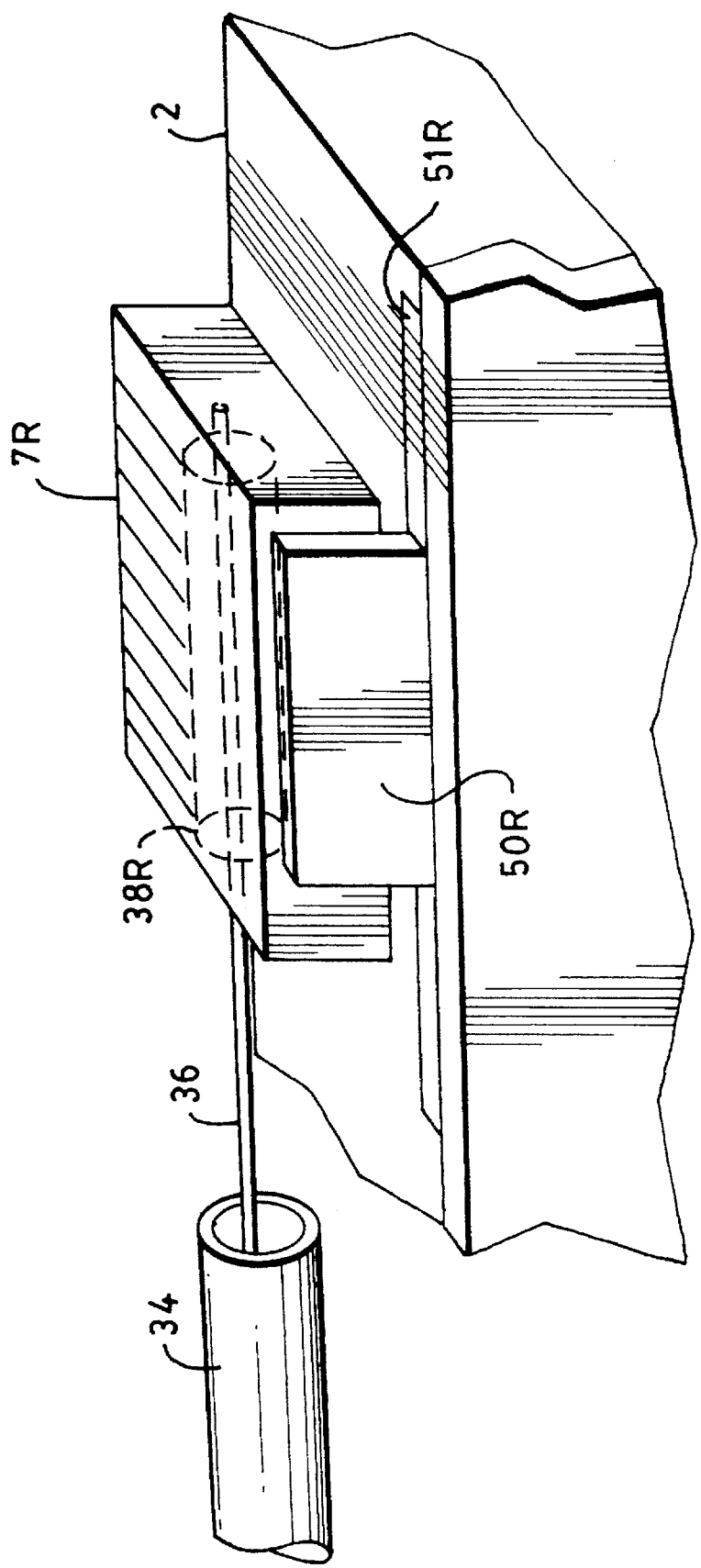
FIG. 6 is a diagrammatic fragmented perspective view of the right slider of the actuation mechanism of FIG. 1.

A complete left lens assembly of a pair of variable focus eyeglasses according to the invention is shown in FIG. 2. The frame, i.e. a longitudinally extending support member 2, longitudinally extends in the plane of the (assembled) lens assemblies. The frame 2 includes ribbon slot 30L, bore 32L, and slot 51L (see corresponding slot 51R in FIG. 6) milled to accept the left cam ribbon 46L, actuator 4L, and the sheathed cable and slider assembly 11. A cap/nose rest 10 is installed followed by a retainer 12L, circularizing hard shell 14L, distensible saran membrane 55L, membrane mount 66L, front ring 60L with hinges 22, elastomeric seal 54L, rigid rear substrate 56L and rear ring 70L with an actuator tab 28L. Of course, the right lens assembly (not shown) is constructed from similar elements. It may be desirable to mill the tops of the frames so that the left and right sliders 7L, 7R are recessed (as shown in FIG. 1) and therefore not visible from a front view of the eyeglasses.

The operation of variable focus lens assemblies of the invention is effected by the relative displacement of the assembly's front and rear members in accordance with the teachings of U.S. Pat. No. 5,138,494 issued on 11 Aug. 1992 to Stephen Kurtin, and incorporated herein by reference in its entirety. The operation of such a variable focus lens assembly is shown in the present application in FIGS. 3A and 3B for a portion of a lens assembly corresponding to the left eye. Turning first to FIG. 3A, a left transparent rigid substrate, typically a rigid lens 56L with a corrective prescription carried on its rear surface, and an elastomeric membrane 55L connected to a left membrane support (i.e. a front ring) 60L are spaced apart via a left elastomeric seal 54L. A transparent liquid 58 fills the space between the left rigid substrate 56L and the left membrane 55L. When a lens actuator 4L (see FIG. 2) applies a force across the left elastomeric seal 54L at the point of contact of a left adjusting screw 42L (which is also used to calibrate the left lens system to match the focus of the right lens system), then the left elastomeric seal 54L compresses at that point. A pair of hinges 22L (see also FIG. 2) is separated from the point of contact by approximately 180 degrees about the perimeter of the lens system. Hence, the compression at the point of contact will cause the liquid 58L to distend the left elastomeric membrane 55L to the substantially spherical shape shown in FIG. 3B. This distention allows the liquid 58L to act as an additional positive lens. The optical power of the left lens assembly thus depends upon the refractive index of the liquid 58L and the curvature of the elastomeric membrane 55L.

Additionally, a prismatic effect is introduced by the formation of a liquid prism whose power increases as the power of the liquid lens increases. The prism is created in making the distance between the left membrane support 60L and the left rigid substrate 56L in the vicinity of left adjusting screw 42L non-uniform with the space between the left membrane support 60L and the left rigid substrate 56L near the spaced pivots or hinges 22L. As previously mentioned, the hinges 22L are preferably positioned along the perimeter of the lens assembly opposite the point of contact of screw 42L. The left membrane support 60L then pivots about an imaginary straight line connecting the hinges 22L. This motion, in addition to causing the left membrane 55L to bulge outward to create a positive lens, causes a change in the angle between the plane of the left membrane support 60L and the plane of the left rigid substrate 56L, creating a base-in liquid prism whose power increases as the power of the liquid lens increases. The ratio of prism optical power to liquid lens optical power is controlled by locating the pivot points of the hinges 22L closer to or further from the actuation point of the left adjusting screw 42L. The closer the pivot points are to the actuation point, the greater will be the prismatic effect as compared to the lens power.

The linear actuation mechanism of one preferred embodiment of the present invention includes (from FIG. 2): the sheathed cable and slider assembly 11; left and right cam ribbons 46L, 46R inserted into ribbon slots 30L, 30R; and left and right lens actuators 4L, 4R inserted into left and right bores 32L, 32R. The linear actuation mechanism is designed to be as small as practicable, both as to length and to diameter. It should be compact, should facilitate broad styling options, should operate with a force gentle enough to be applied by a finger, and should accommodate both right and left handed users. Further, to avoid visual discomfort, the linear actuation mechanism for a pair of lens assemblies in spectacles must track and match each lens assembly so that, for every setting of the sliders 7L, 7R, each of the user's eyes focuses at sensibly the same object distance. This requirement dictates that the linear displacement generated by the lens actuators must be sensibly identical or, to compensate for unusual visual disorders, related in a predetermined manner as to each lens assembly. The calibration, i.e. matching, of the focal lengths of the left and right lens assemblies is provided, as earlier noted, by a right calibration screw 42R for the right lens assembly (see FIG. 4), and a corresponding left calibration screw 42L (FIGS. 3A and 3B) for the left lens assembly. Furthermore, to assure accurate tracking, the generation of this displacement must not twist either lens assembly about any axis.

The above preferred embodiment of a linear actuation mechanism according to the current invention, as shown in the various figures, more specifically includes a sheathed cable and slider assembly 11 which, when manually activated by either the left or right slider, simultaneously moves the left ribbon 46L and the right ribbon 46R along ribbon slots 30L and 30R, respectively, so that cam surfaces 49L and 49R can move along lens actuator slot surfaces 47L and 47R to move the lens actuators 4L, 4R in and out of the dowel slots 32L and 32R, in turn compressing or decompressing the variable focus lenses via screws 42L and 42R so as to alter the focus of the left and right lens assemblies.

The sheathed cable and slider assembly 11 shown in FIG. 2 includes a cable 36 (see FIG. 6), a tube or sheath 34, and left and right sliders 7L and 7R, respectively. The tube 34 connects the left and right portions of the frame, and the cable 36 is connected to each slider. The left and right sliders 7L, 7R which are attached to tabs 50L, 50R are manually moveable within the constraints of the lengths of slots 51L and 51R. Each slider 7L, 7R is connected to one end of a cam ribbon 46L, 46R (see FIGS. 5A and 5B) having cam surfaces 49L, 49R and tabs 50L, 50R. The tube 34, shown in cutout in FIG. 6, actually extends into bore 38R. It is important to note that cable 36 snugly fits into tube 34 and into the bores 38L, 38R of sliders 7L, 7R to provide full support of the cable, and to prevent buckling of the cable when it is subjected to the interactive push/pull action of sliders 7L, 7R.

The cam ribbon 46R shown in FIG. 5A is appropriate for use with the right lens assembly, whereas a similar cam ribbon 46L with the cam surface 49L reversed (from surface 49R) is shown in FIG. 5B as appropriate for use with the left lens assembly. The cam ribbons 46L, 46R are inserted into ribbon slots 30L, 30R, respectively, where they are jointly moved back and forth in accordance with the manual operation of either one of the sliders. The cam surfaces 49L, 49R of ribbons 46L, 46R pass through slots 48L, 48R along cammed surfaces 47L, 47R of slotted dowel pieces 44L, 44R. Together, a block 40L, a slotted dowel piece 44L and an adjusting screw 42L make up a left lens actuator 4L. Similarly, a right lens actuator 4R includes a block 40R, a slotted dowel piece 44R and an adjusting screw 42R. The adjusting screw 42L engages the left rear ring 70L at a singular point so that the left elastomeric membrane 54L can be either compressed or decompressed. Hence when either one of the sliders 7L, 7R is manually operated, both cam ribbons 46L, 46R will simultaneously move through the ribbon slots 30L, 30R and the cam surfaces 49L, 49R of ribbons 46L, 46R will engage the surfaces 47L, 47R of the dowel pieces 44L, 44R causing the lens actuators 4L, 4R (which each include a dowel piece 44L or 44R, a block 40L or 40R and an adjusting screw 42L or 42R) to move in or out of bores 32L, 32R. The dowel action will either compress or decompress the elastomeric membranes 54L, 54R at points of the adjusting screws 42L, 42R, causing the elastomeric membranes 55L, 55R to either distend or retract, thus varying the focus of each lens system.

A second preferred embodiment of a linear actuation mechanism would have the sliders 7L and 7R cammed on their bottoms to directly interact with the actuation mechanisms 4L and 4R, respectively, dispensing with the need for left and right ribbons 46L and 46R. In this case, the pivot points (i.e. hinges 22L) would be located opposite the actuation mechanisms at the bottom of each eyeglass assembly.

In using a wire passing through a tube, the inventive linear actuation mechanism is both slender and strong. The tube is strong enough to both prevent the wire from buckling under compression, and to be used to form part of the frame structure itself. The mechanical simplicity of the linear actuation mechanism, along with its tubular nature, makes it suitable for incorporation into a wide range of frame designs with different aesthetic appeal.

Figure 7:
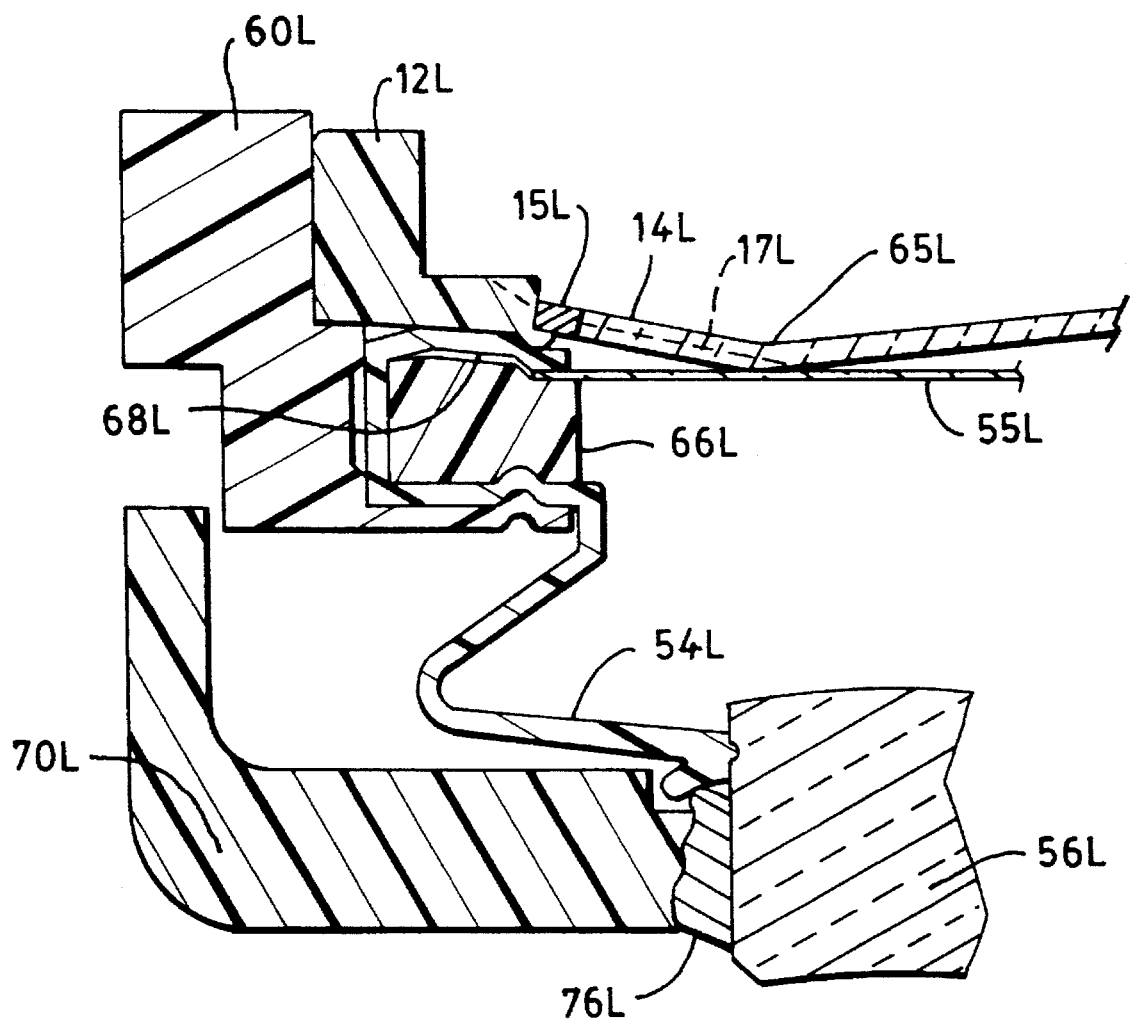
FIG. 7 is an enlarged cross-sectional side view of a section of the variable focus lens system according to the invention.
Figure 8A:
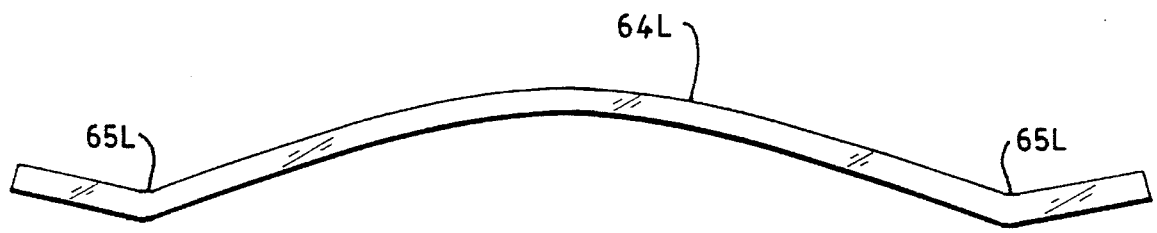
FIG. 8A is a cross-sectional side view of a circularizing hard shell for a left lens system according to the invention.
Figure 8B:
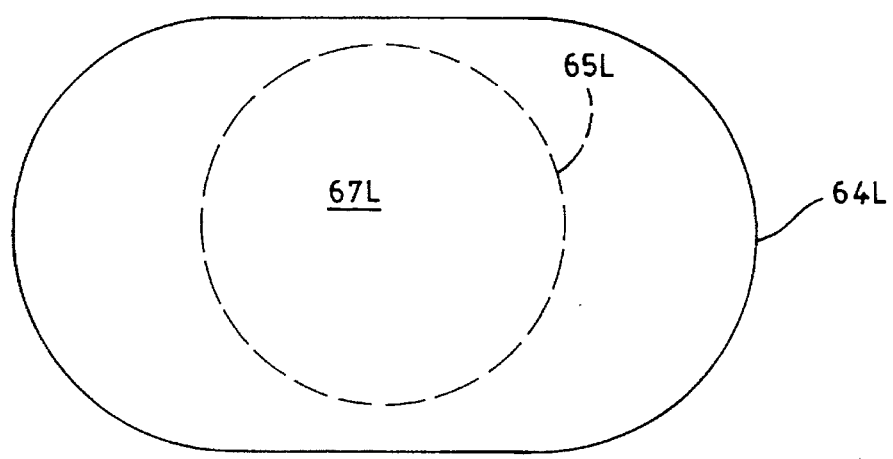
FIG. 8B is a top view of the circularizing hard shell for the left lens system.

It is important to note that the elastomeric membrane 55L should distend across a circular lens so that the distended membrane will form a substantially spherical shape, resulting in the liquid acting as a positive lens. This circularizing effect can be accomplished for a variety of shapes of eyeglass lenses in accordance with the structure of FIG. 7 (showing a cross-sectional cutout portion of a left lens assembly). FIG. 7 shows a plastic rigid rear substrate 56L spaced apart from the elastomeric membrane 55L with the space therebetween filled with the transparent liquid 58L as previously discussed. The left elastomeric membrane, i.e. seal 54L, is attached to the rear substrate 56L with an epoxy 76L, and to the elastomeric membrane 55L with an epoxy 68L. The front ring 60L and the rear ring 70L provide support for the overall structure, while the retainer 12L supports the circularizing hard shell 14L. One way to fabricate the elastomeric membrane 55L and the circularizing hard shell 14L is to first fasten the membrane 55L to the hard shell, then install the two piece unit into the lens assembly. The circularizing hard shell 14L is translucent and is manufactured to exhibit a circular area 67L which is distinguished from the rest of the shell 14L by the bend or groove 65L (see FIGS. 8A and 8B). By manufacturing the shell in this manner, a circular region 67L can be obtained using a broad range of shapes for the rigid substrate 56L. The bend 65L in the circularizing hard shell 14L, which bend is invisible to the user, outlines a circle with respect to the field of view of the user. Thus, when the elastomeric membrane 55L distends, it will follow the shape of the circularizing hard shell, resulting in a spherical liquid lens characteristic as desired and necessary for proper focusing. Also, a microvent 17L (shown by the dotted line in FIG. 7) extends through both the hard shell 14L and the retainer 12L via filter 15L to allow air exchange between the cavity (located between the membrane 55L and the hard shell 14L) and the exterior of the lens assembly. The filter 15L is preferably of the type to let air pass while preventing the transfer of moisture within the air.

The above embodiments of the invention are exemplary rather than all inclusive, in that numerous modifications within the scope of the invention as claimed would be apparent to one of ordinary skill in the art.

What is claimed is:

1. Variable power spectacles comprising:

a longitudinally extending support member;

a pair of lens assemblies, each lens assembly comprising a rigid substrate, a membrane that is both extensible and distensible with respect to said rigid substrate, an elastomeric seal separating said substrate and said membrane about a periphery, and a transparent liquid between said substrate and said membrane, said pair of lens assemblies being mounted in spaced apart relationship with respect to one another on said support member; and a linear actuation mechanism connected to said support member, said linear actuation mechanism comprising lens actuators having blocks connected to dowels having slots, said dowels being moveable in and out of bores within said support member, a pair of sliders connected to a sheathed cable, a pair of ribbons with cam surfaces, said ribbons being simultaneously moveable by manual activation of said sliders along ribbon slots within said support member, said cam surfaces interacting with said dowel slots to move said dowels in and out of said bores for simultaneously compressing or decompressing said elastomeric seals of said pair of lens assemblies with adjusting screws attached to said blocks of said lens actuators.

2. Eyeglasses comprising:

a left lens assembly comprising: a rigid left lens; a left transparent elastomeric membrane positioned across a field of view of a user through said rigid left lens and sealed to a periphery of a left membrane support, said left membrane support spaced from a perimeter of said rigid left lens to said left membrane by a left flexible seal, said left flexible seal having a springable section allowing relative motion between said rigid left lens and said left membrane; and a transparent liquid forming a liquid left lens by filling a space enclosed by said rigid left lens, said left membrane and said left flexible seal;

a right lens assembly comprising: a rigid right lens; a right transparent elastomeric membrane positioned across a field of view of said user through said rigid right lens and sealed to a periphery of a right membrane support, said right membrane support spaced from a perimeter of said rigid right lens to said right membrane by a right flexible seal, said right flexible seal having a springable section allowing relative motion between said rigid right lens and said right membrane; and a transparent liquid forming a liquid right lens by filling a space enclosed by said rigid right lens, said right membrane and said right flexible seal;

a frame supporting both said left and right lens assemblies; and an actuation mechanism comprising:

a left slider mounted onto the frame adjacent to said left lens assembly and slidably connected to a right slider mounted onto the frame adjacent to said right lens assembly via a sheathed wire so that both sliders are simultaneously moveable when the wire moves within the sheath, said left and right sliders both having cammed bottoms;

a left lens actuator comprising a slotted left dowel connected to a left block having a left adjustment screw engaging said springable section of said left flexible seal, said left dowel slidably engaged with a left bore in said frame;

a left rigid ribbon engaged along a cammed surface at one end to said cammed bottom of said left slider and slidably engaged at another cammed end, through a first slot in the frame along a periphery of said left lens assembly, to said slot in said left dowel;

a right lens actuator comprising a slotted right dowel connected to a right block having a right adjustment screw engaging said springable section of said right flexible seal, said right dowel slidably engaged with a right dowel slot in said frame; and a right rigid ribbon engaged along a cammed surface at one end to said cammed bottom of said right slider and slidably engaged at another cammed end, through a second slot in the frame along a periphery of said right lens assembly, to said slot in said right dowel;

said actuation mechanism simultaneously providing said relative motion between said lenses and membranes by transferring manual movement of said sliders by a user to the wire, the ribbons and the dowels.

3. The eyeglasses of claim 2, further comprising:

a left transparent circularizing hard shell having a convex circular section with respect to the field of view corresponding to the left rigid lens, said left hard shell being secured to said left membrane support by a retainer; and a right transparent circularizing hard shell having a convex circular section with respect to the field of view corresponding to the right rigid lens, said right hard shell being secured to said right membrane support.

4. Variable power eyeglasses comprising:

a longitudinally extending frame;

a pair of lens assemblies attached to said frame in laterally spaced apart relationship from one another, each of said assemblies comprising a transparent rigid substrate that serves as a base lens, a membrane support comprising a closed ring, a transparent membrane attached to said membrane support and positioned over substantially the full visual field of a user of said eyeglasses, flexible sealing means extending between said substrate and said membrane support around the peripheral edges thereof, and a transparent liquid, said substrate and said membrane support being spaced from one another to provide an enclosed cell between said substrate and said membrane in which said liquid resides and being further adapted for relative movement such that movement toward and away from one another causes said membrane to extend or distend to change the optical power of said cell in correspondence with the relative position of said substrate and said membrane support; and a manual linear actuator mechanism mounted to said frame for causing relative motion between said substrate and said membrane support, said linear actuator means being mounted for linear motion in a line substantially parallel to said longitudinal frame, said actuator means comprising camming means for imparting motion to said membrane supports in a direction substantially perpendicular to a plane containing said lens assemblies as said linear actuator mechanism is moved along said line.

* * * * *